United States Patent [19]

Vranish

[11] Patent Number: 5,244,406

[45] Date of Patent: Sep. 14, 1993

[54] SPLINE SCREW PAYLOAD FASTENING SYSTEM

[75] Inventor: John M. Vranish, Crofton, Md.

[73] Assignee: The United States of America as represented by the Administrator of the National Aeronautics and Space Administration, Washington, D.C.

[21] Appl. No.: 947,612

[22] Filed: Sep. 21, 1992

[51] Int. Cl.$^5$ ........................................... H01R 13/00
[52] U.S. Cl. .................................................... 439/362
[58] Field of Search ............... 439/345, 346, 359, 361, 439/362, 364–366

[56] References Cited

U.S. PATENT DOCUMENTS

| | | | |
|---|---|---|---|
| 4,641,798 | 2/1987 | DeHaan et al. | 244/173 |
| 4,771,971 | 9/1988 | Ludwig et al. | 244/158 R |
| 4,906,123 | 3/1990 | Weskamp et al. | 403/322 |
| 4,929,184 | 5/1990 | Emadi et al. | 439/362 |
| 4,948,369 | 8/1990 | Braccio et al. | 439/347 |
| 4,993,132 | 2/1991 | Manz | 439/362 |

Primary Examiner—Joseph H. McGlynn
Attorney, Agent, or Firm—Paul S. Clohan, Jr.; R. Dennis Marchant; Guy M. Miller

[57] ABSTRACT

A system for coupling an orbital replacement unit (ORU) to a space station structure via the actions of a robot and/or astronaut. A first female spline connector is located on the space station structure, a male spline connector is positioned on the ORU to connect to the first female spline connector, and a second female spline connector is located on the ORU. A compliant drive rod interconnects the second female spline connector and the male spline connector. A robotic end effector is used for mating with and driving the second female spline connector. Also included are alignment tabs located on the ORU for berthing with the space station structure. The first and second female spline connectors each include a threaded bolt having a captured nut located thereon which can translate up and down the bolt but are constrained from rotation. The nut has a mounting surface with a first electrical connector for translating with the nut. A complementary second electrical connector on the ORU mates with the first electrical connector on the nut. When the driver on the robotic end effector mates with the second female spline connector and rotates, the male spline connector and the first female spline connector lock together, the driver and the second female spline connector lock together, and the nut translates up the threaded bolt carrying the first electrical connector up to the complementary second connector for interconnection.

4 Claims, 6 Drawing Sheets

SPLINE SCREW PAYLOAD FASTENING SYSTEM

ORIGIN OF THE INVENTION

The invention described herein was made by an employee of the United States Government, and may be manufactured and used by or for the Government for governmental purposes without the payment of any royalties thereon or therefor.

TECHNICAL FIELD

This invention relates generally to attachment means for joining two bodies together and more particularly to a means for permitting a robot or astronaut with hand tool to safely berth and attach an object to a fixture in outer space (micro gravity).

CROSS REFERENCE TO RELATED APPLICATIONS

This invention is related to inventions shown and described in U.S. Ser. Nos. 07/824,126 (GSC 13,430-1), entitled "Work Attachment Mechanism/Work Attachment Fixture", filed in the name of John M. Vranish, the present inventor on Jan. 22, 1992 and 07/946,111, entitled "Spline Screw Multiple Rotations Mechanism", filed in the name of John M. Vranish, the present inventor on Sep. 17, 1992. The above are assigned to the assignee of the present invention. Moreover, the teachings of these related applications are herein meant to be incorporated by reference.

BACKGROUND ART

There is a considerable body of prior art which deals with robotic payload fastening techniques. These fall basically into three categories. One of these involves various "single point actuation" strategies. That is, a robot grasps a single interface fixture on a payload, typically an "H" plate, and activates a shaft inside. By a series of mechanical appendages (typically levers, belts, cams, and/or pulleys), multiple attachment latches along the payload perimeter are activated and the payload is attached. In some cases, the process includes the mating of electrical power and signals from the fixture to the payload (but not from the robot to the payload) and in other cases, not. In certain cases the power and signals transfer is part of the action taken by the mechanical appendages. In other cases, it is a blind mate process with the robot providing the insertion force. In still other instances, a separate and independent process is employed for the electrical connector mating after the payload, itself, is mated and secured.

A second category uses two or more attachment screws which are activated, one at a time. The screws are alternately torqued down, one torque increment at a time to prevent cocking. This is a straight forward and simple technique, but "soft dock" appendages can complicate the system. Typical of this technique is the NASA "Solar Max" mission which employs this type of mating and fastening screws.

A third category uses a "Zip Nut" technique. The "Zip Nut" has its female thread segmented so that the male component can be pressed directly into the female component and seated using the insertion force of the robot (or astronaut). The segmented thread sections spring away from the male thread sections permitting the screw to penetrate into the nut in a one way ratcheting process. In the unfastening process, the two members are unscrewed in a conventional manner.

DISADVANTAGES OF PRIOR ART

All prior art examples shown above, are unable to interface electrical signals and power between a robot and a payload. And, for all prior art described above, the robot (or astronaut) grasps the payload by a cumbersome "H Plate" which protrudes above the payload surface and thus is subject to snagging.

The "single point actuation" concepts shown above are all relatively complex. One of these methods uses a series of levers running the length of the payload to engage a payload mounting fixture in several places along the perimeter of the payload. This complicates the system. And, if one of the levers should jam or buckle, the system could become unsafe. In addition, in such complex system it is invariably difficult to design-in astronaut overrides. The complexities also add to weight, reduce reliability and occupy space that could be more profitably used by payload instrumentation. And, each of the perimeter attachments are unlikely to share the perimeter loads or to preload equally. This could be very dangerous during launch conditions. Also, the sum of the preloads on each of the perimeter attachments plus other losses is equal to the force applied by the single point drive. Thus, these preload forces are necessarily limited. The electrical and power connections are actuated separately in one system. This has the advantage of being certain, reliable and safe; but it adds to system complexity, weight and demands on space in the payload volume. Another system is also complex, with chains (or belts) and clutches. In all the prior art systems, the preload force on each of the perimeter attachments is limited to a fraction of the force generated by the single point drive. In some, electrical/power connection is done by the robot as part of the insertion process. And, this means that the number of electrical/signal pins is limited because the robot cannot overcome large cumulative pin insertion forces. It also opens the possibility of cocking and jamming the payload. The situation is even more dangerous during disengagement and removal.

The prior art technique which uses two or more screws on the perimeter is also disadvantaged. While it has the advantage of simplicity and reliability, it nevertheless has several disadvantages. First, because of the nature of the screws which must be employed to provide the proper preload, to be impervious to cross threading and to prevent backdriving under launch conditions, these screws have typically required excessive drive torques (approximately 100 ft-lbs) to achieve and hold their preloads. This is more than standard robot End Effectors are able to provide. The Special End Effectors therefore required are large and cumbersome and severely restrict robot dexterity and work volume. With such large torques required and with the large attendant uncertainties in frictional forces, the screws can vary widely in the tensile forces they carry when preloaded, causing some to fail more easily than others. This, of course, reduces safety. The electrical/power connector problems remain. And, these are the same as for the "single point actuation" situation described above.

The prior-art technique which uses "Zip Nuts" also has its disadvantages. It does save time during insertion because the screws can simply "zip" into the nuts. Like the basic screw technique described above, this system can cross thread during insertion unless the threads are kept relatively coarse. And this means that large drive torques will be required for final seating and preload. This, in turn, means Special End Effectors and losses in robot dexterity and work volume. Also, because the nut threads are serrated, there will be relative flexing between screw and nut during the vibrations of launch and landing with relative motion between the two and the attendant increased possibility of impact, fatigue and failure. During payload removal, the "Zip Nuts" must be unscrewed in a conventional manner. As with the case of the two or more screws on the payload perimeter, the electrical/power connector problem must be addressed separately. This either means using the insertion force of the robot with all the that attend or adding a separate actuation limitations and dangers that attend or adding a separate actuation system to deal with the problem.

STATEMENT OF THE INVENTION

It is therefore an object of the present invention to provide a fastening system to permit a robot to reliably and safely fasten payloads to a fixture in a Zero "G" as well as a one "G" environment such that these items remain secure through a shuttle launch and landing.

Another object of the present invention is to provide a fastening system that is able to supply power and signals to a payload through both a robot and through fixture interfaces.

A further object of the present invention is to provide a fastening system that is compatible with the other NASA concepts so that a consistent Comprehensive Fastening Strategy (CFS) can be pursued.

These and other objects are achieved by a new application of a Spline-Screw device. For each attachment point on an Orbital Replacement Unit (ORU), we have a Mini Work Attachment Fixture (WAF) at the top of a box connected by a shaft to a Mini Work Attachment Mechanism (WAM) or a Special End Effector (SEE) at the bottom of the box. Corresponding to each of these attachment subsystems is a Mini WAF embedded in a Space Station structure. The system is arranged such that a robot SEE or Astronaut hand tool can screw into the top of the payload at one of the attachment points and complete the necessary hand-offs in force and electricals required to attach the payload to the Space Station structure or remove it as required. Consequently:

(a) The systems arrangement of the component parts at each attachment point are such that the hand-offs are correct during the attachment/detachment process.

(b) A technique for independently permitting insertion compliance at both the top and the bottom of the payload is utilized.

(c) A technique, and associated hardware, for locally reacting forces is used; in one instance between, the top of the box and the robot SEE or Astronaut hand tool, and in another, between the bottom of the box and the Space Station structure.

(d) A timing system, and associated hardware, is used which:

i. Prevents the robot or Astronaut from having to cope with more than one torque at a time. For example, in attaching a payload to the Space Station structure, the torque between the robot SEE or the Astronaut hand tool is first released. Then shortly after, the torque builds up between the payload and the Space Station structure. This has the effect of maximizing the effective torque of the robot SEE or Astronaut hand tool at no cost in safety.

ii. Ensures the correct hand-off sequence during payload attachment/detachment. For example, during attachment, the sequencing from total attachment of the payload to the robot SEE (or Astronaut hand tool); through shared attachment between the robot SEE (or Astronaut hand tool) and Space Station structure-, to total attachment to the Space Station structure and ejection and release from the robot SEE (or Astronaut hand tool) must be correct.

2) There is a second new application of a Spline Screw concept in which a Small Object is attached to a Space Station structure. The issues are similar to those of the ORU, and the common interface (less electrical connections) to the robot SEE or Astronaut hand tool is identical, but the systems particulars are very different:

(a) The systems arrangement of the component parts at each attachment point are such that the hand-offs are correct during the attachment/detachment process.

(b) The technique and associated hardware for independently permitting insertion compliance both between the robot SEE or Astronaut hand tool and the top of the Small Object and between the bottom of the Small Object and the Space Station structure.

(c) The technique, and associated hardware, for locally reacting forces in the one instance between the top of the Small Object and the robot SEE or Astronaut hand tool and the other between the bottom of the Small Object and the Space Station structure.

(d) The timing system, and associated hardware, which:

i. Prevents the robot or Astronaut from having to cope with more than one torque at a time. For example, in attaching a payload to the Space Station structure, the torque between the robot SEE or the Astronaut hand tool is first released. Then shortly after, the torque builds up between the payload and the Space Station structure. This has the effect of maximizing the effective torque of the robot SEE or Astronaut hand tool at no cost in safety.

ii. Ensures the correct hand-off sequence during payload attachment/detachment. For example, during attachment, the sequencing from total attachment of the payload to the robot SEE (or Astronaut hand tool); through shared attachment between the robot SEE (or Astronaut hand tool) and Space Station structure; to total attachment to the Space Station structure and ejection and release from the robot SEE (or Astronaut hand tool) must be correct.

ADVANTAGES OF INVENTION OVER PRIOR ART

1) Exceptional holding forces and torques. This is both for rattle free preloaded forces and torques and for ultimate forces and torques.

2) Outstanding capabilities in passing electrical power and signals.

3) Built in protection for the electrical and signal connectors.

4) Simplicity, reliability and minimum number of parts. Also, of the required parts many of these are duplicates (e.g. two WAF's and two WAM Drivers at each ORU attachment point.) Some entire subsystems can be eliminated. For example, grippers, nut runners, separate electrical connector actuation systems and their dust cover actuation systems can all be eliminated.

5) Outstanding hand-off control. This will help, both in an Extra Vehicular Activity (EVA) and a robotic sense. For a robot this means safe payload handling with no tethers required. For EVA operations, this means only one short tether; the hand tool tethered to the Astronaut.

6) Low required actuation torque. This, in turn, means less power and smaller, more dexterous tools (End Effectors in the case of the robot and EVA hand tool in the case of the Astronaut.)

7) Compact size/low mass.

8) Precision rattle free mating between the parts, robot to ORU and ORU to Space Station structure.

9) Enhanced mission capabilities. The robot (or Astronaut) will now be able to communicate with and get power to the payload. Thus, sensors can be added to the payload for safe precision docking. Other sensors inside the payload can report the health of the instruments inside or the integrity of the connection, etc. The robot or Astronaut can even communicate through the payload to Space Station.

10) Enhanced capability to handle and secure very small objects in zero "g".

11) Elimination of the protruding "H" plate handle interfaces currently required on each object to be grasped.

12) Simplified controls. This technique is essentially a direct "peg-in-the-hole". Acquiring an object with a gripper in zero "g" is less direct and hence more difficult with respect to controls. This would be more apparent during teleoperation.

DETAILED DESCRIPTION OF THE INVENTION

I will address fastening two types of payloads. The first will be the case of fastening a moderately large box (in the 2 ft×4 ft ×4 ft region) which is typical of an Orbital Replacement Unit. The other will be the case of fastening a very small object.

ORU Fastening/Unfastening

I will begin with the case where it has been decided that an ORU on a Space Station must be replaced. One can assume that it is secured to a Space Station by four bolts of the Spline Screw variety (one on each corner), these being necessary to get the system through launch. The robot will begin by loosening the three auxiliary screws labelled $F_2$, $F_3$, and $F_4$ in FIG. 1. ORU 4, at this point is secured only by the Primary Fastener labelled $F_1$ in FIG. 1.

Figure 1:
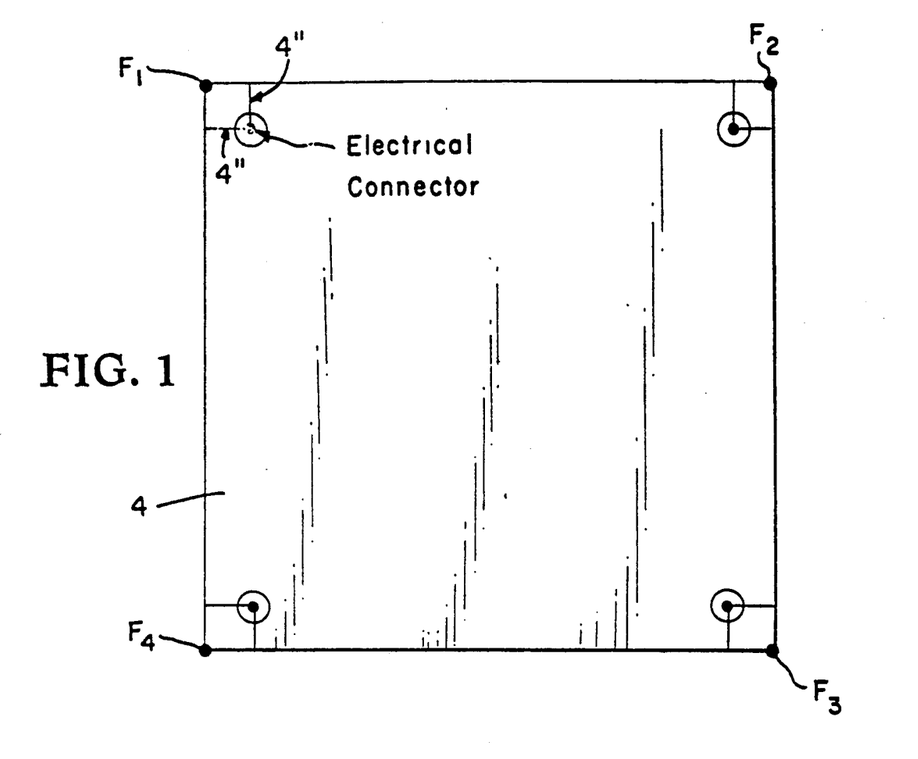
FIG. 1 is illustrative of typical ORU payload fastening.
Figure 2:
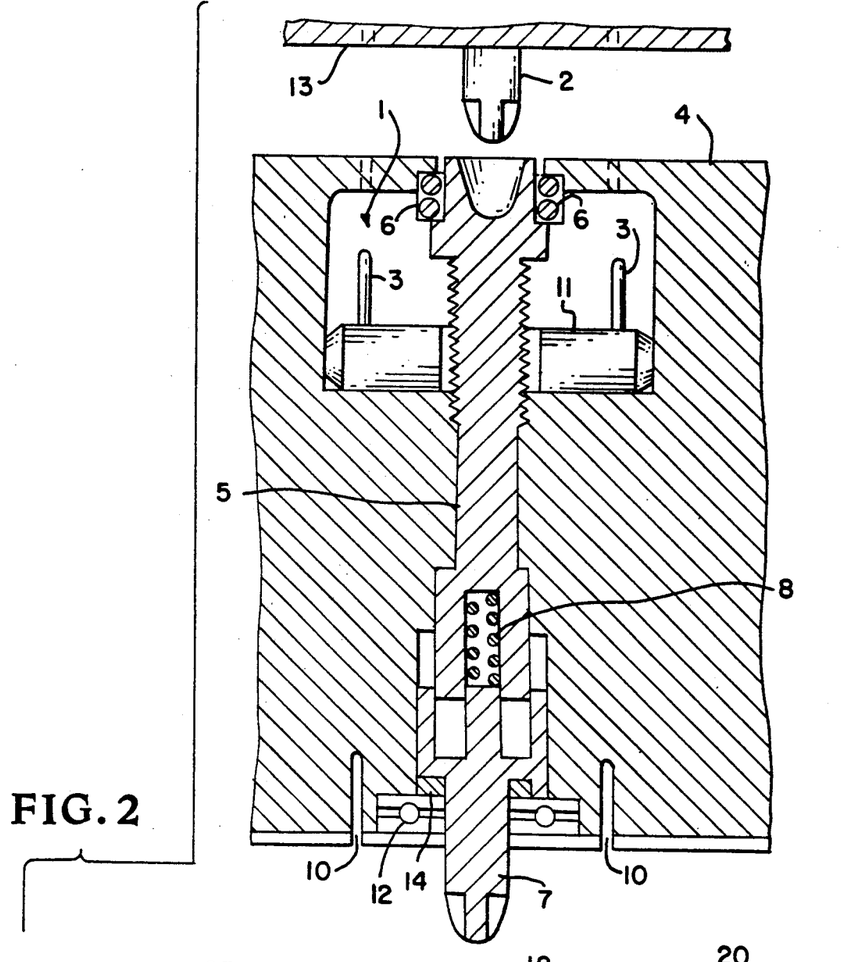
FIG. 2 is a cross-sectional view of a Spline Screw Payload Fastening System according to the present invention.
Figure 3:
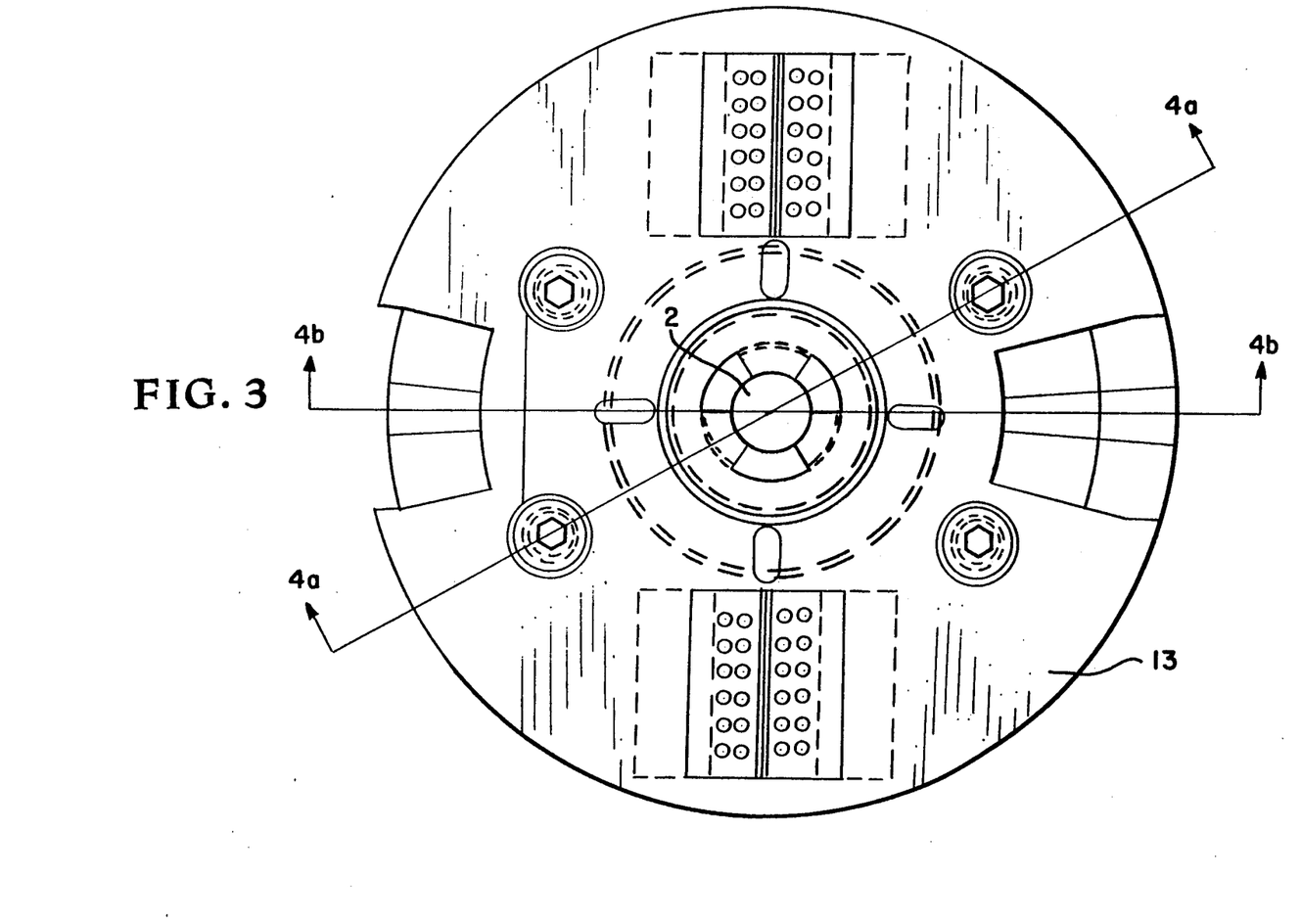
FIG. 3 is a face view of a robotic end effector.

I will now describe a general strategy for attaching and removing ORU's. (See FIG. 1 which shows a top view of ORU fasteners $F_1$-$F_4$ and moment arms) and "Estimated Performance in Executing General ORU Fastening Strategy" below. From FIG. 1, there would typically be four holding fasteners for ORU 4 structure, shown as $F_1$, $F_2$, $F_3$, and $F_4$. At least one of these fasteners must be constructed with two Payload Structural and Electrical Connector's (PSEC's) and must be located such that its center is a nominal minimum distance from the nearest corner of the ORU 4 structure (4 in. from each of the nearest sides is a reasonable distance). Thus, if this were the only fastener on ORU 4, the robot would still be able to locate and fasten ORU 4 to a mounting point on Space Station structure 20 (FIG. 2). Because the single fastener would be offset from the nearest corner, a moment would develop during the fastening process which would tend to align and fix each of the four fastening points.

For $F_p$=1000 lbf, we get $F_1$=901.2 lbf, $F_2$=$F_4$=15.4 lb and $F_3$=67.9 lbf And, even though the alignment forces have discrepancies in amplitude, the inherent stiffness of Space Station structure 20 and ORU 4 mounting points (not the stiffness of ORU 4 itself) would ensure that the positional discrepancies would be nil. Thus, with a single, simple fastener we get location, alignment, soft and hard docking, electrical power and signals, and single point actuation. No belts, pulleys, clutches, cams or levers are required. And, with the fastener so near the corner of ORU 4, there is minimal sacrifice and inconvenience to ORU 4 performing its primary instrumentation mission. In the instance where the robot is replacing ORU's on a Space Station, only one single fastener need be used. In the instance where the robot is preparing an ORU for reentry, the one fastener would be used initially and then the other three activated (one by one) to allow the structure to survive landing. Where the robot is encountering an ORU in space for the first time, each of the three auxiliary fasteners would be loosened first and then the robot would deal with the primary fastener as described above. In those instances where more than one fastener is employed, it is important that the robot perform fastening and unfastening with the Driver of the SEE just slightly unseated (approx. 0.160 in.) from the payload so that it can drive the payload fastener without the mating Splines locking.

It should also be mentioned that not every fastener need have electrical connectors (and the Dust Covers that accompany). In these cases, the timing will be the same as will the fastening. The SEE will function perfectly well with or without electrical connections.

Primary Fastener $F_1$, a Spline Screw Payload Fastening System according to the present invention, is shown in FIG. 2, and consists essentially of two modules which I have termed PSEC's. Upper PSEC 1 is just below the surface of ORU 4 nearest the robot (not shown), and Lower PSEC 3 is just beneath the surface of a Space Station structure 20. These PSEC modules are joined together by a drive rod consisting of an Upper Drive Rod 5 splined to a Lower Drive Rod 7. Upper Drive Rod 5, acting in conjunction with Lower Drive Rod 7, permits SEE Driver 2 of SEE 13 to both disconnect ORU 4 from Space Station structure 20 and to fasten ORU 4 to the robot (not shown). The timing of this handoff is such that ORU 4 is either secured to both the robot and Space Station 20, or to one or the other, but it is never out of control during the fastening sequence. The details of this handoff are described below.

I will first described the sequence where ORU 4 is initially secured to Space Station structure 20 and the robot grasps it, and unfastens and removes ORU 4 from Space Station structure 20.

SEE Driver 2 engages Upper Drive Rod 5, turns clockwise and soft docks into upper PSEC module 1 (Lower Drive Rod 7 is already engaged to Lower PSEC 3). At this point ORU 4 is held by both the robot and Space Station structure 20.

SEE Driver 2 builds up clockwise torque until both the Upper and Lower PSEC modules 1 and 3 break away from their preload. This should require on the order of 11 ft-lbs; 10 ft-lbs to break away Lower PSEC module 3 and 1 ft-lb to break away the preload on Upper PSEC module 1. These values assume a 1000 lb preload on Lower PSEC 3 and a 100 lb spring preload on both. Supporting calculations will be presented below under expected performance.

SEE Driver 2 continues to turn clockwise. Upper Drive Rod 5 in Upper PSEC 1 begins to move downward and, simultaneously, Lower Drive Rod 7 in the lower part of ORU 4 begins to move upwards. The forces in lower PSEC 3 (Space Station 20 to ORU 4 interface) begin to transfer immediately. The 1000 lb preload force locking ORU 4 to Space Station 20 recede very quickly to the 100 lbf Spring 22 preload (or hard dock) force. Nevertheless, ORU 4 remains firmly and safely attached to both Space Station 20 (in hard dock) and the robot (in soft dock). In Upper PSEC 1, essentially no force transfers occur until Upper Drive Rod 5 translates downward far enough to take out the Spline Screw seating clearances (approx. 0.030 in.).

SEE Driver 2 continues to turn clockwise. The forces in Upper PSEC 1 begin to transfer from preloading PSEC Nut/Electrical Connector 11 against the ORU to preloading Upper Drive Rod 5 against the Driver of the SEE and, accordingly, hard docking SEE Driver 2 (and robot) against ORU 4. Thus ORU 4 is now hard docked (100 lb) to both the robot and Space Station 20 structure. At the same time Bolt 18 in Space Station 20 structure begins to translate downwards, and begin the process of disconnecting its electrical power and signal connectors.

SEE Driver 2 continues to turn clockwise. The upper and lower PSEC interfaces remain coupled in hard dock to the robot and the Space Station 20 structure respectively. Lower PSEC Nut/Electrical Connector 9 continues to disengage pins 3 from ORU Receptors 10. Upper PSEC Nut/Electrical Connector 11 begins progressing upwards opening the Dust Covers of both Upper PSEC 1 and the SEE of the robot.

SEE Driver 2 continues to turn clockwise . The upper and lower PSEC interfaces remain coupled in hard dock to the robot and Space Station structure 20 respectively. Lower PSEC Nut/Electrical Connector 9 completes its disengagement of pins 3 from ORU Receptors 10 and continues moving downwards towards seating. Its Dust Covers begin to close. Upper PSEC Nut/Electrical Connector 11 pins 3 begin to engage the receptacles (not shown) of the SEE.

SEE Driver 2 continues to turn clockwise. The Dust Covers of lower PSEC 3 (and those of the mating surface of ORU 4) close, the Nut/Electrical Connector 9 of lower PSEC 3 seats against Space Station structure 20 and bolt 18 moves upwards slightly (about 0.030 in.) ejecting ORU 4 from Space Station structure 20. This upwards movement also acts to move lower Drive Rod 7 out of hard dock first, and then shortly after, out of soft dock with the Bolt 18. At the same time, upper PSEC 1 (and hence ORU 4) remains attached to the robot in hard dock with its Nut/Electrical Connector 11 moving upwards sufficient to activate the collision avoidance sensing system. ORU 4 is now ready for removal from the Space Station structure 20.

The robot removes ORU 4 from the Space Station structure 20. While the hard dock preload of 100 lbs is sufficient to permit manipulation of ORU 4 by the robot, SEE Driver 2 will turn clockwise again until Nut/Electrical Connector 11 is preloaded against upper PSEC 1 structure and the robot and ORU 4 are preloaded together to 500 lbs to 1000 lbs (depending on operational requirements).

DOCKING AND ATTACHMENT OF THE ORU TO THE SPACE STATION

The robot will first manipulate ORU 4 to a preliminary position immediately above the Lower PSEC 3. SEE Driver 2 turns counterclockwise a few turns sufficient to relieve its 500 lbs to 1000 lbs preload. However, the robot and ORU 4 remain securely fastened together in hard dock.

The robot then mates ORU 4 into Space Station structure 20 receptacles (typically pins mating into holes or mating tapers or balls mating into grooves). The lower Drive Rod 7 will comply upwards due to the action of Compliance Spring 8. The robot and ORU 4 remain securely fastened together in hard dock.

SEE Driver 2 turns counterclockwise. Lower Drive Rod 7 pops into the Bolt 18. ORU 4 is now secured to Space Station structure 20 in soft dock and to the robot in hard dock.

SEE Driver 2 continues to turn counterclockwise. Bolt 18 breaks out of its storage preload torque (approximately 1 ft-lb) and turns with Lower Drive Rod 7. (Note that Space Station PSEC 3 and Lower PSEC 3 have threads opposite to each other. This includes the Locking Splines and the captive threads.)

SEE Driver 2 continues to turn counterclockwise. Bolt 18 translates downwards until the seating clearances (approximately 0.030 in.) between Lower Drive Rod 7 and Bolt 18 locking spline surfaces are eliminated and the Spring 22 preload forces of Lower PSEC 3 are transferred to Lower Drive Rod 7 and Bolt 18. At the same time, Nut/Electrical Connector 11 of Upper PSEC 1 moves downwards (approximately 0.030 in.). At this point, ORU 4 is secured to both the robot and Space Station structure 20 in hard dock (100 lbs each).

SEE Driver 2 continues to turn counterclockwise. Nut/Electrical Connector 11 of Upper PSEC 1 moves downward, disengaging its Pins 3 from their respective SEE receptacles as it goes. Simultaneously, Nut/Electrical Connector 9 of Lower PSEC 3 moves upwards, first opening the Dust Covers and then its pins 3 engaging their respective receptacles 10 on the lower surface of ORU 4. At this point, ORU 4 is secured in hard dock by both the robot and Space Station Structure 20. There is an electronics power and signal connection to ORU 4 from both the robot and Space Station structure 20 (and potentially from Space Station structure 20 to the robot). And, of course, both sets of Dust Covers are open.

SEE Driver 2 continues to turn counterclockwise. Nut/Electrical Connector 11 of Upper PSEC 1 moves downwards until pin 3 disengagement is complete, Upper PSEC 1 dust covers close and Nut/Electrical Connector 11 encounters a stop on its lower surface. Simultaneously lower Nut/Electrical Connector 9 translates upwards engaging its electrical pins 3 ever deeper into their corresponding receptacles 10 in the lower surface of ORU 4. At this point ORU 4 remains held in hard dock by both the robot and Space Station structure 20.

SEE Driver 2 continues to turn counterclockwise. Upper Drive Rod 5 translates upwards, forcing a separation between the SEE of the robot and the upper surface of ORU 4 (approximately 0.030 in.). In the process, SEE Driver 2 comes out of soft dock and is now ready for removal. Also, upper PSEC Nut/Electrical Connector 11 is preloaded against the ORU structure such that it can stay positioned during launching and landing. Simultaneously, lower PSEC Nut/Electrical Connector 9 translates upwards until it completes the engagement of its electrical pins 3 and encounters a hard stop. At this point, Lower Drive Rod 7 and Bolt 18 lock together with a preload of 1000 lbs for approximately 8 ft-lbs input torque. (it is useful to note that the timing between Upper PSEC 1 and Lower PSEC 3 is not critical, except that Upper PSEC 1 must take SEE Driver 2 out of hard dock and soft dock before Lower PSEC 3 reaches full preload and thus restricts the ability of SEE Driver 2 to turn. Up to this point, Upper Drive Rod 5 can continue to translate upwards against Preload Spring 6 of approximately 100 lbs without substantially changing the preload or the performance of the system. At this point, ORU 4 is locked to Space Station structure 20 in 1000 lbs preload and the robot is unlocked and free to go.

SUMMARY OF THE CRITICAL HAND-OFF ISSUES

In the case where the ORU is initially secured to the Space Station structure:

The Lower Drive Rod 7 locking splines must come out of hard dock and, very shortly thereafter, soft dock while robot's SEE Driver 2 locking splines are still in hard dock. This is to ensure that the robot's SEE does not lock up in preload between the robot and ORU 4 before it can free ORU 4 from Space Station structure 20. The robot can then lift ORU 4 free of Space Station structure 20 and, having accomplished this, rotate its SEE clockwise the remaining increment needed to induce preload locking between the robot's SEE and ORU 4.

In the case where ORU 4 is initially secured to the robot:

ORU 4 is placed slightly above its docking point on Space Station structure 20 and robot's SEE Driver 2 is rotated counterclockwise just sufficient to relieve the locking preload forces (about 500 lbf to 1000 lbf) and take the system to hard dock (approximately 100 lbf). This is done to allow SEE Driver 2 to apply essentially all its torque to the task of attaching ORU 4 firmly to Space Station structure 20.

SEE Driver 2 locking splines must go through hard and soft dock before Lower Drive Rod 7 locking splines engage in locking preload. This enables the robot to be able to free itself from ORU 4 before locking preloads inhibit SEE Driver 2 from turning. The delay between the two events is not critical as the Upper Drive Rod 5 will simply translate upwards against Preload Spring 6 with no substantial effect on operations or preload forces.

It will also prove useful to ensure that there is a period in the two hand-off situations described above where electrical connections are made both from the robot to ORU 4 and from ORU 4 to Space Station structure 20. In such circumstances, the robot will be in direct communications (and power, if necessary) with Space Station structure 20.

In many cases, not all of the fasteners of a particular ORU 4 will require electrical connectors. Thus, there will be a need for fasteners which do mechanical fastening only and which do not have electrical connectors. These will be constructed and operated the same as those that do except the electrical connectors and Dust Covers will be omitted. In such instances, of course, significant simplifications and weight savings are possible.

Fastening of a very Small Object

Figure 6:
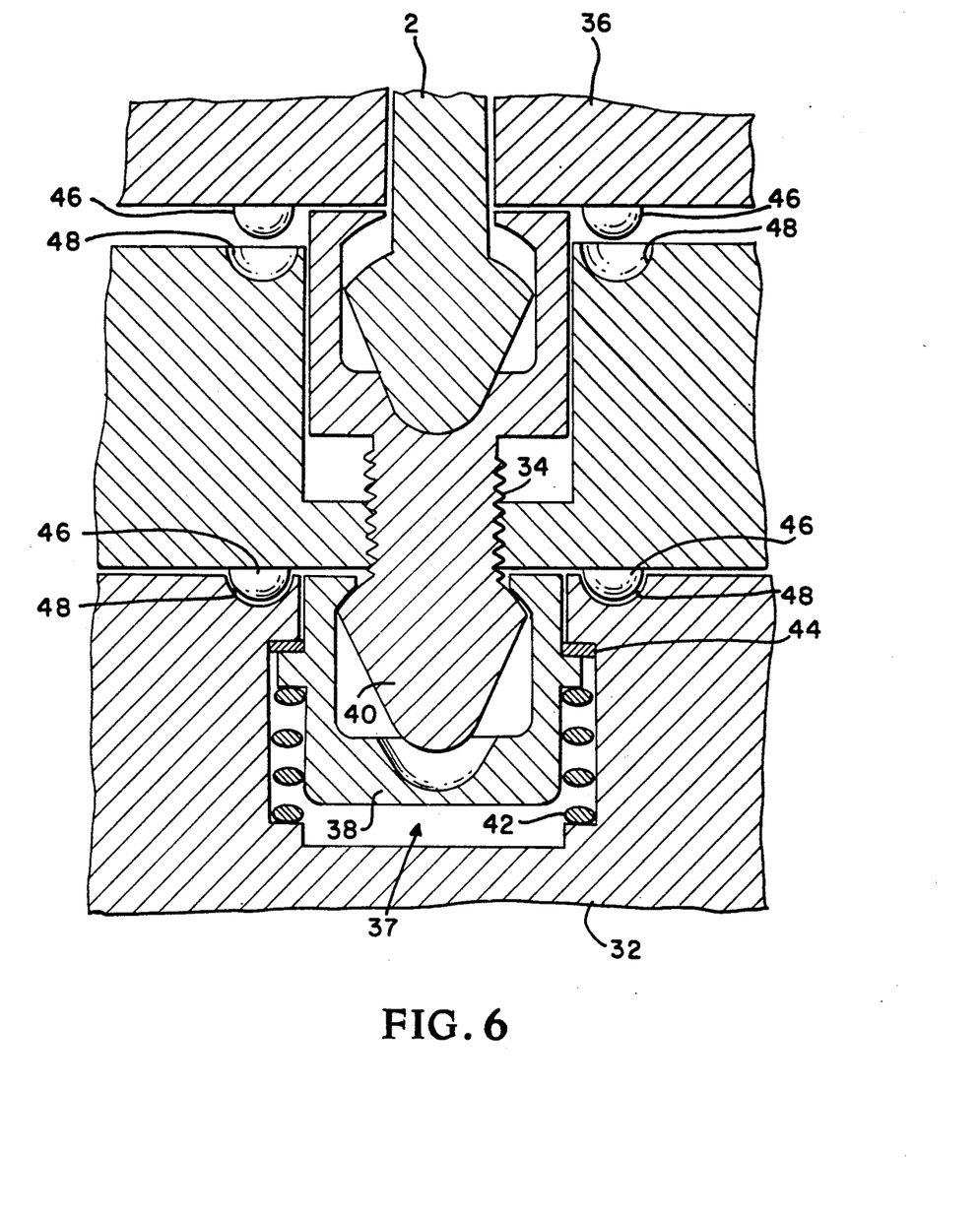
FIG. 6 an illustration of fastening a small object using the present inventive techniques.

FIG. 6 illustrates the smallest Object 30 that can be secured to a Structure 32 (1.75 in.×1.75 in.×1.25 in.). In this case, which is representative for small objects in general, a Bolt 34 is threaded into object 30 such that it pierces that object. Bolt 34 has an interface on one end which is compatible with SEE Driver 2 of SEE 36 and an interface on the other end which replicates SEE Driver 2. Mini WAF 37, which is embedded into structure 32 to which object 30 is to be secured, consists of a Rotary Socket 38 which can receive the male end 40 of Bolt 34, a Flat Wavy Preload Spring 42 and a Load Bearing Surface 44 (such as a teflon-coated lock washer). Flat Wavy Preload Spring 42 is "geared into" mating surfaces in the Rotary Socket 38 and the Space Station structure 32 as shown. These contacts are lubricated. There are Torque/Locating Tabs 46 and corresponding Small Object Torque/Locating Slots 48 on SEE 36, Small Object 30 and structure 32 as shown.

The process of transferring Small Object 30 from robot SEE 36 to Space Station Structure 32 will now be discussed. The robot, with Small Object 30 secured to SEE 36 inserts male end 40 of Bolt 34 into Mini WAF 37. Mini WAF 37 will yield in compliance and the robot will sense and nullify any misalignments (using its 6 DOF force/torque sensor). This completed, the robot would use its roll axis to rotate Small Object 30. Geared Flat Wavy Preload Spring 42 will prevent Mini WAF 37 from rotating so male end 40 will "pop" into Mini WAF 37 and attach Small Object 30 to Space Station Structure 32 in soft dock. The robot will push down gently and rotate Small Object 30 again until corresponding Torque/Locating Tabs 46 and Slots 48 of Small Object 30 and Space Station Structure 32 "popped" into alignment. This will be sensed by the robot both from its six DOF force/torque sensor and its roll axis motor currents. This complete, the robot SEE 36 will rotate counterclockwise and Mini WAF 37 with it. Flat Wavy Preload Spring 42 will flex slightly (together, then apart) during the rotation as its geared lubricated surfaces slid across corresponding surfaces in Rotary Socket 38 and Space Station Structure 32. During this process, Bolt 34 piercing Small Object 30 will translate upwards towards the robot. This translation would first take the robot-Small Object hold from preload to soft dock; thus leaving both the interface from robot to Small Object 30 and from Small Object 30 to Space Station Structure 32 in a soft dock which can rattle slightly, but cannot be pulled apart. (There is no hard dock in this hand-off sequence). As Bolt 34 translation continues, robot SEE Driver 2 will leave soft dock and male end 40 of the Bolt 34 will eject SEE 36 from Small Object 30. Shortly afterwards, Small Object 30 will go into preload against Space Station Structure 32. The loads will be concentrated on the Load Bearing Surfaces of Bolt 34 (minimal frictional losses), on the corresponding Load Bearing Surface of the Rotary Socket 38 (minimal frictional losses), on the threads joining Bolt 34 (main source of frictional losses), and on load bearing surface 44 inside the Mini WAF (secondary source of frictional losses, shown as a teflon-coated lock washer 44 in FIG. 6). At this point, Small Object 30 will be secured to Space Station Structure 32 with a strong preload and the robot will be released from Small Object 30 and free to go elsewhere.

The process of transferring Small Object 30 from Space Station Structure 32 to robot SEE 36 will now be discussed. The robot will approach Small Object 30 fastened to Space Station Structure 32 and insert SEE Driver 2 into the female interface of Bolt 34. The compliance spring (not shown) of robot SEE 36 will yield and the robot will use its six DOF force/torque sensor to correct misalignments. This accomplished, the robot will spin SEE Driver 2 clockwise until it "pops" into the female socket of Bolt 34 and secures a soft dock between the robot and Small Object 30. This accomplished, the robot will press down gently and turn its roll axis until Torque/Locating Tabs 46 of SEE 36 seat in the corresponding Torque/Locating Slots 48 of Small Object 30. Again, this seating would be verified by the robot's six DOF force/torque sensor or by robot wrist roll motor currents or by both. At this point, Small Object 30 will be secured in soft dock to the robot and in preload to Space Station Structure 32. SEE 36 will then begin rotating clockwise again. Bolt 34 and Rotary Socket 38 of Mini WAF 37 will turn with it. This will cause Bolt 34 to translate downwards. In the translation process, the Small Object-Mini WAF hold will go from preload to soft dock (temporarily leaving Small Object 30 held in soft dock by both the robot and Mini WAF 37); then from soft dock to ejection from Mini WAF 37. Shortly after, the Small Object-robot SEE hold would go from soft dock to preload and the robot would be free to go elsewhere with Small Object 30 safely and securely in its grasp. It should be noted that Small Object 30 ejection from Mini WAF 37 is accomplished by pushing male end 40 of Bolt 34 against the floor of Mini WAF 37.

Performance

GRASPING FORCE: Since the SPLINE SCREW PAYLOAD FASTENING SYSTEM is configured similarly to the WAM/WAF and End Effector Change Mechanism (EECM), the grasping force will be approximately 1000 lbf using 8 ft-lbf driving torque. And, as in the examples of the WAM/WAF and EECM, the system will not inadvertently back drive.

Figure 4A:
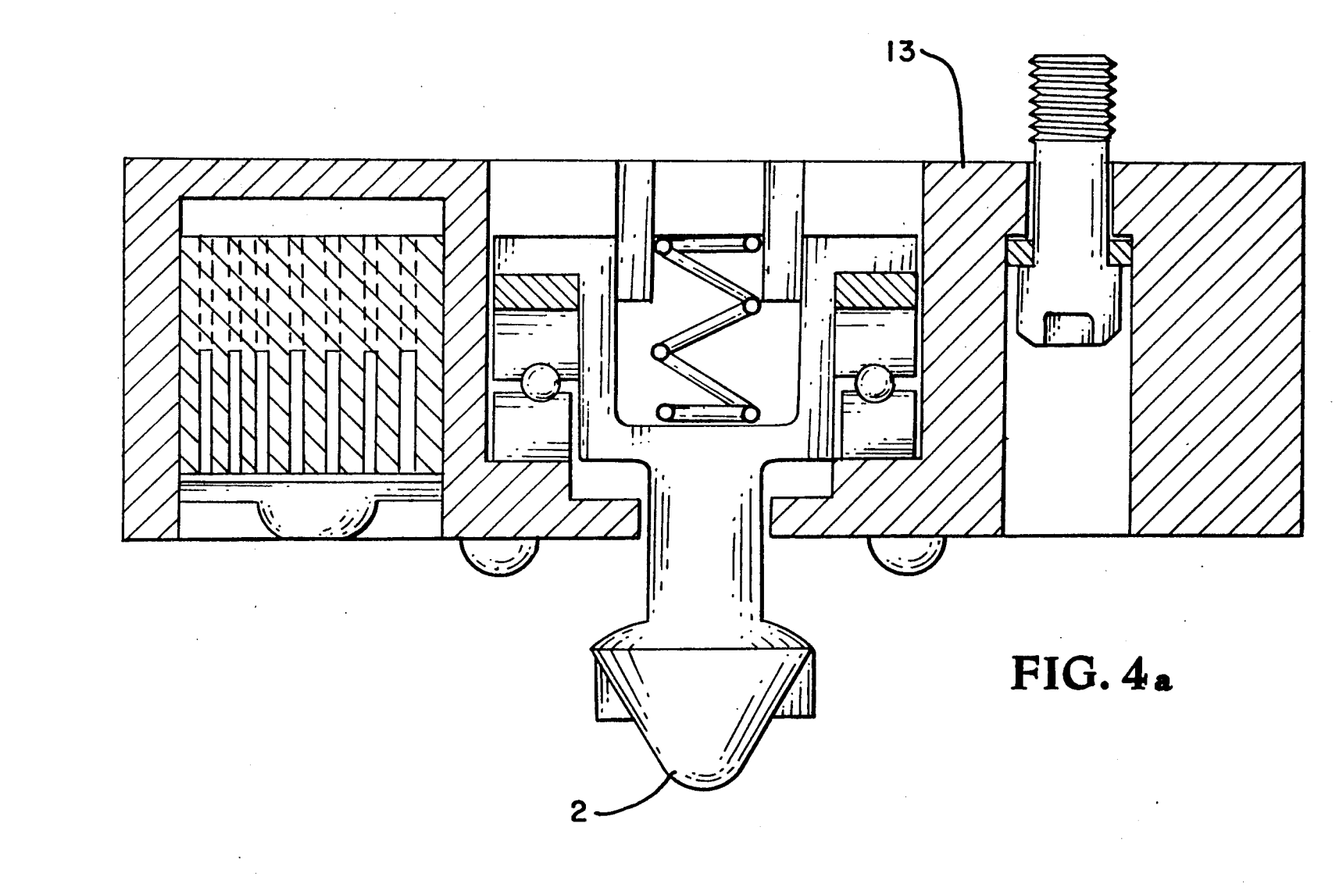
FIG. 4a is a cross sectional view along lines 4a—4a in FIG. 3.
Figure 4B:
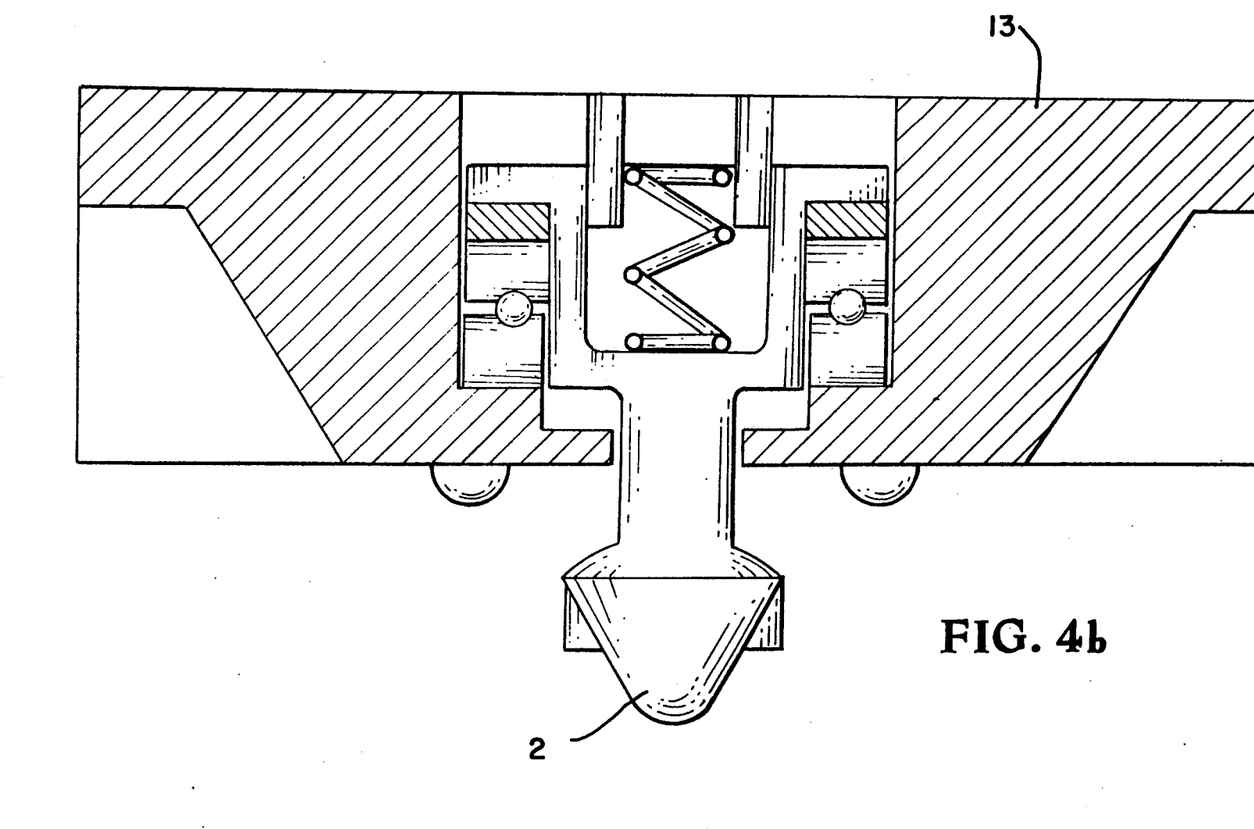
FIG. 4b is a cross sectional view along lines 4b—4b in FIG. 3.
Figure 5:
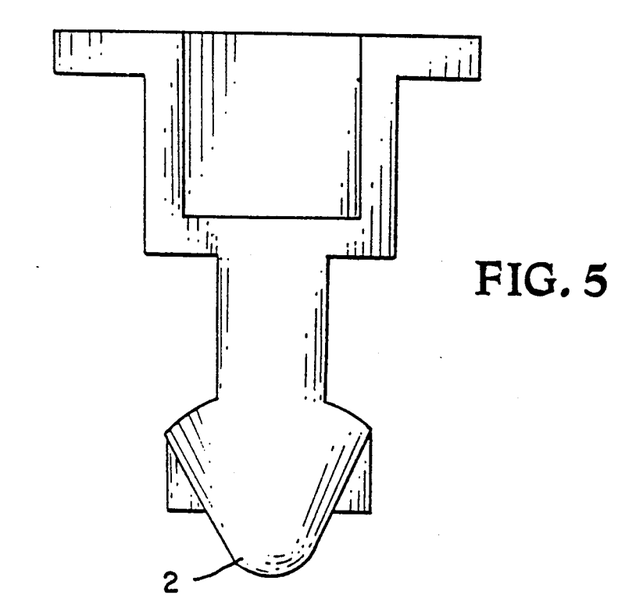
FIG. 5 is a view of a special end effector driver.

HOLDING TORQUES: The ability of the SSPFS to structurally react axial rotational torque is practically unlimited because of the structural strength of the clocking and alignment tabs (FIGS. 4a and 4b). The ability of the SSPFS to structurally react torque attempting to separate the SEE and the ORU in tilt is described below. 1000 lbf/6 = 167 ft-lbs with preload and thus remain rattle free. The system will be able to withstand up to 1,560 ft-lbf torque without yield. Thus, the holding torque of the system even in preload will be more than that which a space robot could supply.

$$F_{yi}R_{see} = T_{yi} = \sigma A_s R_{see} = 1,560 \text{ ft-lbf}$$

Where:

$F_{yi}$ = Force the SEE Driver can withstand before yield
$R_{see}$ = Radius of the structure of the Standard End Effector = 2 in
$T_{yi}$ = Torque (in tilt direction) the system can withstand before yield.
$\sigma$ = Yield strength of SEE material in PSI = 85 E 3 lbf/in$^2$ = $\pi(\frac{1}{2})^2/4$ HOLDING FORCES: The maximum holding force with preload in the Z or axial direction is 1000 lbf. The maximum holding force to yield is 9,380 lbf. Shear forces X and Y are practically unlimited because these forces are opposed by the clocking tabs shown in FIG. 4.

PRELOAD SPRING DESIGN: As is shown in FIG. 6, the preload spring is long (on the order of 1 in.) and so it can translate upwards distances on the order of $\frac{1}{8}$ in. without significantly changing the spring force nominally 100 lbf.

I will now estimate the torque losses caused by this 100 lbf preload. Because the radius of the bolt is small to start with ($\frac{1}{2}$ in.), these torque losses will not be excessive. Placing thin teflon washers between the spring and the threaded bolt and between the spring and the PSEC structure further reduces the coefficient of friction to a minimum and with it, significantly reduces the torque losses.

$$F_{ps}\mu_{s1}R_b = T_{pbs} = 0.21 \text{ ft-lbf}$$

Where:

$F_{ps}$ = Preload spring force = 100 lbf
$\mu_{s1}$ = Static coefficient of friction for bolt = 0.05 for teflon
$R_b$ = Bolt radius = 0.5 in.

The preload spring, however, also acts on the captive threads of the bolt when the bolt is preloaded in its storage condition. In this instance we have:

$$F_{ps}\mu_{s2}R_{ct} = T_{pct} = 0.410 \text{ ft-lbf}$$

Where:

$\mu_{s2}$ = Static coefficient of friction for captive threads = 0.15 for silver
$R_{ct}$ = Captive thread radius = 5/16 in.

And, thus the total torque losses will be less than 1 ft-lbf which is acceptable.

ELECTRICAL CONNECTIONS: As is the case with the WAM/WAF and the EECM, power and signal interfaces are handled with exceptional efficiency. That is, the alignment in hard dock between the mating pairs is very precise as is the travel of the electrical connector. Thus, electrical (and fiber optic) connectors mate with great precision. This means that long lead-in guides are not required and the system can be made very compact. Also, because of the large forces generated by the system (easily 100 lbf in its weakest mode of removal using the Bolt preload spring), pin insertion and removal forces are not a factor. Even with the compact configuration presented in this specification, approximately 40 power/signal channels will be available.

Performance in executing general ORU fastening strategy $$\sum_{n=1}^{4} F_n + F_p = 0.$$

Where:
$F_n$ = Reaction force on n'th corner of the ORU.
$F_p$ = Preload force of Locking Spline Screw.

$$\sum_{n=1}^{4} M_{xn} + M_{xp} = 0.$$

Where:
$M_{xn}$ = Moment about the x axis of the n'th reaction force on the ORU.
$M_{xp}$ = Moment about the x axis of the Spline Screw preload force acting on the ORU $$\sum_{n=1}^{4} M_{yn} + M_{yp} = 0.$$

Where:
$M_{yn}$ = Moment about the y axis of the n'th reaction force on the ORU.
$M_{yp}$ = Moment about the y axis of the Spline Screw preload force acting on the ORU A typical ORU is postulated by the NASA program office as consisting of a box-like structure 2 ft thick and 4 ft on each of the sides of its base. And, selecting the X-Y axis as shown on FIG. 1, we have:

$$\sum_{n=1}^{4} M_{xn} + M_{xp} = 0. \text{ Which results in } F_2 = F_4.$$

$$\sum_{n=1}^{4} F_n + F_p = 0. \text{ Which results in } F_1 + 2F_2 + F_3 = F_p.$$

$$\sum_{n=1}^{4} M_{yn} + M_{yp} = 0. \text{ Which results in } F_1 - F_3 = \frac{5}{6} F_p.$$

Assuming a perfectly rigid ORU: $\frac{R_{y3}}{R_{y2}} = \frac{F_3}{2F_2}$

Where:
$R_{y2}$ = Moment arm from preload force to $F_2$ for twist about Y axis.

$R_{y3}$ = Moment arm from preload force to $F_3$ for twist about Y axis.

Thus we have:

$$\begin{bmatrix} 1 & 2 & 1 \\ 1 & 0 & -\frac{5}{6} \\ 0 & 1 & -\frac{5}{22} \end{bmatrix} \begin{bmatrix} F_1 \\ F_2 \\ F_3 \end{bmatrix} = \begin{bmatrix} F_p \\ F_p \\ 0 \end{bmatrix}$$

And for $F_p$ = 1000 lbf, we get $F_1$ = 901.2 lbf, $F_2 = F_4$ = 15.4 lb and $F_3$ = 67.9 lbf.

Performance in Securing Small Objects

The Mini WAF preload spring 42 must have sufficient preload to prevent the Rotary Socket 38 from rattling during launch and landing vibrations.

$$W_{mWAF}n = F_{ps} = 3.6 \text{ lbf.}$$

Where:
$W_{mWAF}$ = Weight of the mini WAF = 0.2 lbs.
n = Number of "g's" encurred during launch; normally greater than or equal to 18
$F_{ps}$ = Required force of the preload spring And, the Mini WAF must be sufficiently resistant to torque as to permit the Small Object Driver to rotate with respect to the Rotating Socket during alignment and seating. This, in turn, would permit the Small Object Splines to line up with the corresponding Rotating Socket Splines and seating between the two to occur.

$$T_{ps} \geq T_{BD}$$

Where:

$T_{ps}$ = Resistent Mini *WAF* preload spring torque
 = $(F_{ps}\mu_{sps} + \blacktriangle F_{tps})R_{mWAF}$ $T_{BD}$ = Frictional torque generated by the Small Object Bolt
 = $(F_{ps}\mu_{sBD})R_{BD}$ With:

$\mu_{sps}$ = Static coefficient of friction of preload spring interface = 0.05 for teflon.

$F_{tps}$ = Change in force acting in the direction to counter the torque due to the "gearing" effect of the wavy flat spring.

$R_{mWAF}$ = Torque lever arm of the mini *WAF* flat spring = 0.625 in.

$\mu_{sBD}$ = Static coefficient of friction of the Small Object Bolt interface = 0.3

$R_{BD}$ = Torque lever arm of the Small Object Bolt = 0.25 in.

Thus:

$$\blacktriangle F_{tps} \geq 0.432 \text{ lbf.}$$

This results in a loss of 5.2 E-2 ft-lbf, which is negligible.

Even assuming that Small Object 30 was fastened with 1000 lbf, the required preload torque would be modest. This preload torque would be the sum of the torque required in overcoming the friction of the teflon-coated lock washer under load and the torque required in overcoming the friction of the silver-coated screw.

$$T_{pl} = F_p\mu_{sw}R_{mWAF} + F_p\mu_{ss}R_s$$

Where:
$T_{pl}$ = Required preload torque = torque used in overcoming friction against the mini WAF teflon coated washer plus torque used in overcoming screw friction.

$F_{pl}$ = Preload force = 100 lbf.

$\mu_{sw}$ = Static coefficient of friction of the teflon coated lock washer $\mu_{ss}$ = Static coefficient of friction of the screw (silver coated)

$R_s$ = Torque lever arm of screw = 0.25 in.

Thus:

$T_{pl} \geq 5.73$ ft-lbf.

Alternate embodiments of the invention

The essentials of the ORU attachment portion of this invention involve:

1) The transmission system. The principle involved is that the robot SEE or Astronaut hand tool must be able to attach to a Mini WAF at a fastening point on the top of the ORU and transmit the proper torque through the ORU to another fastening interface between the bottom of the ORU and the corresponding Mini WAF in the Space Station structure. FIG. 2 shows a splined shaft 5 through ORU 4 as the prime means of torque transmission. This, in turn, means that the fastening point Driver 7 on the bottom of the ORU will turn with it in the same direction. But, to make the hand-offs correct, the corresponding fastening point Mini WAF Bolt (labelled #18 in FIG. 2) must translate in a direction opposite to the Bolt labelled #5 (same FIG.). And, this means that the thread of the fastening point Mini WAF Bolt 18 must be threaded opposite to that of the Bolt labelled #5. Alternately, one could insert a set of bevelled gears. This would permit the Mini WAF at the top of the ORU box and the Mini WAF at the bottom of the ORU box to have identical interfaces, but it would add a small amount of complexity.

2) The force management system. The principle involved is that the forces and torques must be reacted locally. That is, the forces and torques involved in fastening the ORU to the robot SEE or Astronaut hand tool must be reacted locally at the top of the ORU and the forces and torques involved in fastening the ORU to the Space Station structure must be reacted locally at the bottom of the ORU. The preferred solution (FIG. 2) accomplishes this by means of a spring-loaded splined interface connecting shafts #5 and #7 in FIG. 2. This approach also has ORU reaction bearings 12 at the bottom fastening point to improve torque/force transmission and efficiency. There are countless other ways to accomplish this.

3) The compliance system. The principle involved is that there must be two separate and independent compliant interfaces, one at the interface between the robot SEE or Astronaut hand tool and the top ORU fastening point and one between the ORU bottom fastening point and the Space Station structure. In the preferred embodiment, the robot SEE has a built in compliance in its Driver and built into the Locking Spline Driver at the bottom of the ORU (#7, FIG. 2). This is done because it will work and because it seems most simple. Again, there are any number of alternate ways to approach this problem. For example, compliance could be built into the top of the ORU instead of or in addition to the robot SEE driver. Similarly, compliance could be built into the Space Station structure Mini WAF rather than, or in addition to, the Driver at the bottom of the ORU.

4) The hand-off system. The principle involved is that (for fastening an ORU to the Space Station structure) with a single, continuous, rotational motion from the robot SEE Driver or the Astronaut hand tool, the ORU must, in a step-by-step manner, pass from being in control of the robot SEE or Astronaut hand tool to being jointly held by both the robot SEE or Astronaut hand tool and the Space Station structure to being held solely by the Space Station structure and ejecting the robot SEE or Astronaut hand tool. When the direction of the single, continuous, rotational motion of the robot SEE Driver or Astronaut hand tool is reversed, the sequence of events described above would be in inverse order. Again, there are many mechanical timing and gearing arrangements that could be employed as an alternate means of accomplishing this. The hard dock feature which permits an extensive period of shared mechanical control of the ORU between robot SEE/Astronaut hand tool and the Space Station structure is central.

The essentials of the Small Object attachment portion of this invention involve:

1) The attachment/ejection technique. The principle involved is that Small Object 30 must be capable of being fastened to both robot SEE 36 (or Astronaut hand tool) and/or Space Station structure 32; yet it must remain as small as possible. With a very Small Object 30, electrical connections would not be required. Because the robot SEE Driver 2 (or Astronaut hand tool) does not translate and because it essential to fastening, something in Small Object 30 must translate. The approach taken in the preferred embodiment is to pierce Small Object 30 with a simple Object Driver Bolt 34 (FIG. 6) which can translate upwards or downwards according to the direction of rotation of robot SEE Driver 2 (or Astronaut hand tool). Thus Small Object 30 would be able to fasten to Robot SEE 36 (or Astronaut hand tool) or Space Station Structure 32 as required. To facilitate this, however, a rotating socket would be needed in Space Station structure 32. In the preferred embodiment, a simple rotating socket 38 is embedded in Space Station structure 32. Flat spring 42 with gear-type interfaces with Space Station structure 32 and Rotating socket 38 permits proper compliance during the mating of Small Object 30 with Space Station structure 32 and provides a minimal, consistent and predictable resistance to rotation for Rotating Socket 38 so that the male end 40 of Small Object Driver Bolt 34 will turn relative to Rotating Socket 38 and Object Driver Bolt 34 will drop and seat. The preferred embodiment is chosen because it seems the simplest and most direct approach that can be taken and ensure proper job completion. It may not be necessary to use the teflon covered wavy spring 42 with geared interfaces and teflon coating. A plain spring utilizing friction may suffice. This is certainly an alternate embodiment.

2) The torque clocking technique. The principle is to provide outstanding resistance to torque in the smallest and simplest possible package and to provide accurate location. The preferred embodiment shows four torquing tabs 46 constructed on robot SEE 36 (or Astronaut hand tool). The top surface of Small Object 30 and Mini WAF surface would have corresponding slots in whatever orientation pattern desired for the storage of Small Object 30. A ring of closely spaced slots could be employed in a ring providing several fastening location options. This configuration was chosen because it would provide outstanding resistance to torque in a very small, simple package. However, any number of specific solutions could be employed.

3) The Rotary Socket. The principle is to provide a simple, low-frictional loss, rotary interface to permit Object Driver Bolt 34 to rotate as it translates in the process of performing its fastening function. The preferred embodiment was chosen because it seems the most direct and simplest means of performing the necessary functions and because its break-away torque is predictable with teflon-coated wave springs. Again, any number of alternate approaches could be taken to perform the same functions.

4) The hand-off technique. The principle is to maintain positive control of Small Object 30 throughout the fastening or unfastening process. Again, the preferred embodiment was chosen because it would be very effective and because it appears to be the simplest and smallest solution. Without doubt there are any number of alternate solutions.

To those skilled in the art, many modifications and variations of the present invention are possible in light of the above teachings. It is therefore to be understood that the present invention can be practiced otherwise than as specifically described herein and still will be within the spirit and scope of the appended claims.

I claim:

1. A system for coupling an orbital replacement unit to a space station structure comprising:

a first female type spline connecting means selectively located on said space station structure;

a male type spline connecting means positioned on said orbital replacement unit so as to mate with and connect to said first female type spline connecting means;

a second female type spline connecting means located on said orbital replacement unit;

a compliant drive rod interconnecting said second female type spline connecting means and said male type spline connecting means;

means for mating with and driving said second female type spline connecting means;

first type alignment means exteriorly located on said orbital replacement unit for berthing with said space station structure;

second type alignment means exteriorly located on said space station structure for receiving said first type alignment means;

said first and said second female type spline connecting means each including a threaded bolt member having a captured nut member located thereon which can translate up and down the bolt but is constrained from rotation thereabout, said nut member having a mounting surface;

at least one first type electrical connector located on said mounting surface for translating with said nut member;

at least one complementary second type electrical connector on said orbital replacement unit for mating with said at least one first type electrical connector on the mounting surface of said nut member;

whereby when said means for mating with and driving said second female type spline connecting means mates with said second female type spline connecting means and is driven, said male type spline connecting means and said first female type spline connecting means lock together, and said means for mating with and driving said second female type spline connecting means and said second female type spline connecting means lock together, and said nut members translate up the threaded bolt members carrying said first type electrical connector up to said complementary second type connector for interconnection therewith.

2. The system of claim 1 further including a preload spring providing bias to each said threaded bolt member.

3. The system of claim 2 wherein said compliant drive rod includes an upper drive rod and a lower drive rod with a compliance spring therebetween with said upper and lower drive rods being splined together.

4. The system of claim 3 further including a reaction bearing between said lower drive rod and a lower surface of said orbital replacement unit.

* * * * *